United States Patent [19]

Skarud

[11] 4,039,212
[45] Aug. 2, 1977

[54] HOSE END FITTINGS

[75] Inventor: Roland Skarud, Wirsbo, Sweden

[73] Assignee: Wirsbo Bruks Aktiebolag, Wirsbo, Sweden

[21] Appl. No.: 605,162

[22] Filed: Aug. 15, 1975

[30] Foreign Application Priority Data

Apr. 28, 1975 United Kingdom ............... 17572/75

[51] Int. Cl.² .......................................... F16L 33/00
[52] U.S. Cl. ................................... 285/253; 285/156; 285/347; 285/381
[58] Field of Search ............. 285/252, 253, 256, 242, 285/156, 243, 322, 347, 381

[56] References Cited

U.S. PATENT DOCUMENTS

| 371,231 | 10/1887 | Turner | 285/243 |
|---|---|---|---|
| 2,119,645 | 6/1938 | Pearson | 285/243 X |
| 2,453,997 | 11/1948 | MacWilliam | 285/256 |
| 3,257,132 | 6/1966 | Lyons | 285/253 |
| 3,347,571 | 10/1967 | New | 285/256 X |

FOREIGN PATENT DOCUMENTS 275,802 8/1927 United Kingdom ................ 285/253

Primary Examiner—Dave W. Arola
Attorney, Agent, or Firm—Ostrolenk, Faber, Gerb & Soffen

[57] ABSTRACT

The present invention is concerned with hose end fittings and has particular reference to fitting suitable for use in conjunction with a cross-linked polyethylene hose or pipe. The characteristic feature of the fitting of the present invention is a body incorporating a nipple adapted for insertion in a pipe end and a clamping ring normally retained on the body and adapted for clamping action about said outer surface of said pipe end, the nipple and ring being contoured on the inner surface to effect an improved clamping action. In a preferred embodiment the nipple may incorporate an annular groove incorporating an O-ring to assist sealing between the nipple and the internal surface of the tube or pipe.

5 Claims, 4 Drawing Figures

HOSE END FITTINGS

The present invention relates to hose end fittings and has particular reference to a hose end fitting applicable to a union or to a 'T' piece or the like for securing a cross-linked polyolefinic tube to an end of such a component.

It is well known that cross-linked polyolefinic tubes, particularly those manufactured from cross-linked polyethylene, are becoming generally widely used for heating and hot water transport systems as a substitute or replacement for metal tubes. Existing compression fittings tend to be fairly difficult to apply and require the application of an injurious amount of pressure to the tube which effectively prevents a number of coupling and uncoupling operations of a particular tube end to a fitting.

According to the present invention there is provided a tube end fitting comprising a body having a nipple portion adapted for insertion in an end of a tube, a split ring means adapted to fit about said nipple portion, engaging means operative between said ring means and said body to interengage said ring and body to define an annular cavity adapted to accommodate a tube end, and clamp means carried by said ring means and adapted to effect a clamping action of the ring about a tube end disposed over said nipple portion of the body, whereby the engaging means serves to retain the ring means on the body in the clamped and unclamped condition.

The engaging means may be a screw thread and the thread on the ring may be of greater diameter than on the body, thereby permitting ease of inter-engagement between the tube end and the fitting itself. The clamp means may act to take up any resultant play between the thread of the ring and the threads of the body. Alternatively, the retaining means may comprise an annular groove the body and an annular flange on the ring adapted to be accommodated in said groove. The inner surface of the ring may have a plurality of inwardly directed ribs adapted to clamp and secure a tube end about said nipple and to ensure a seal between the tube end and the nipple surface itself.

According to a particular embodiment of the present invention, the nipple portion is contoured on its outer surface to provide a plurality of outwardly directed ribs, adapted to correspond with inwardly directed ribs on the ring to effect and enhance the clamping and securing action of the ring means and nipple portion upon the tube end disposed therebetween. The nipple portion may also incorporate an annular groove accommodating an O-ring.

It has been found that the incorporation of the O-ring which may be of neoprene or like material, may be desirable to overcome slight leakage which can occur after several temperature cycles of the joint. A plurality of O-rings may be employed.

The clamp means may comprise a screw carried in a lug on one side of the split in the ring means which screw is adapted to engage with a threaded lug on the other side of said split whereby rotation of the screw in one direction acts to draw the lugs together.

The ring preferably has a split inclined to the axial direction, and the angle of inclination of the split in the ring is preferably within the range 10° to 20° to the axial direction. The tube end fitting may be a T-piece or a union or may be a union to another component such as a radiator, boiler or the like.

The end fitting may be manufactured of a corrosion resistant material or it may be treated with Rilsan or similar surface treating agent by dip coating in a powder.

Following is a description by way of example only and with reference to the accompanying informal drawings of a T-piece incorporating the tube end fitting in accordance with the present invention.

Figure 1:
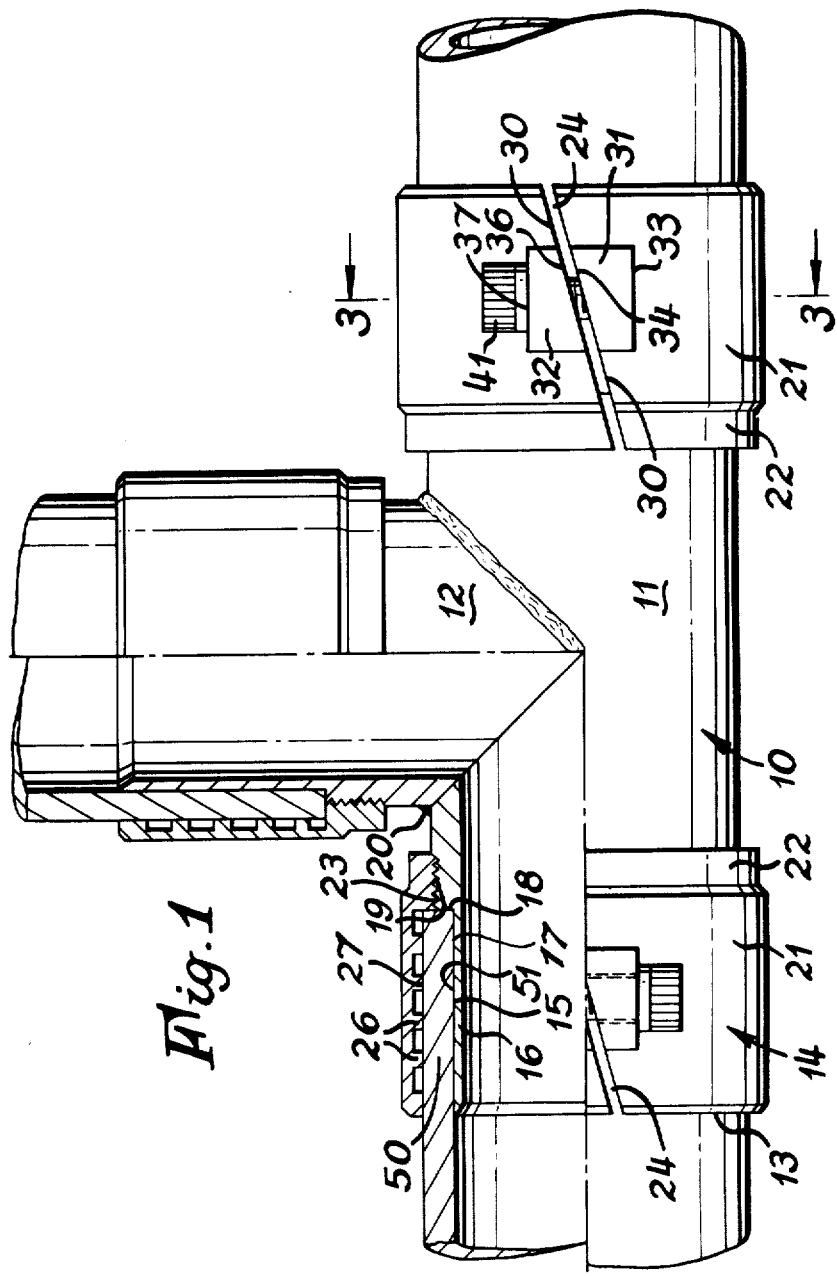
FIG. 1 is a view partly in section of the T-piece.
Figure 2:
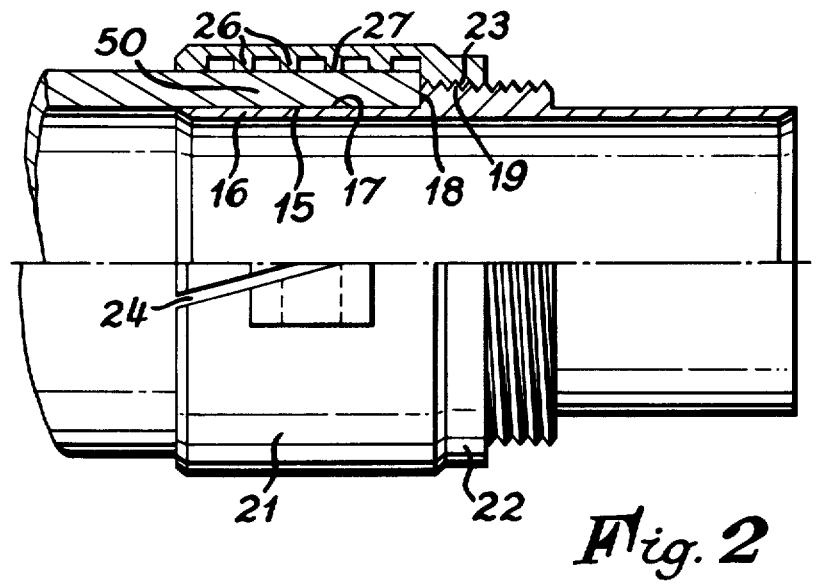
FIG. 2 is a detail of the tube end fitting incorporated in the T-piece of FIG. 1.
Figure 3:
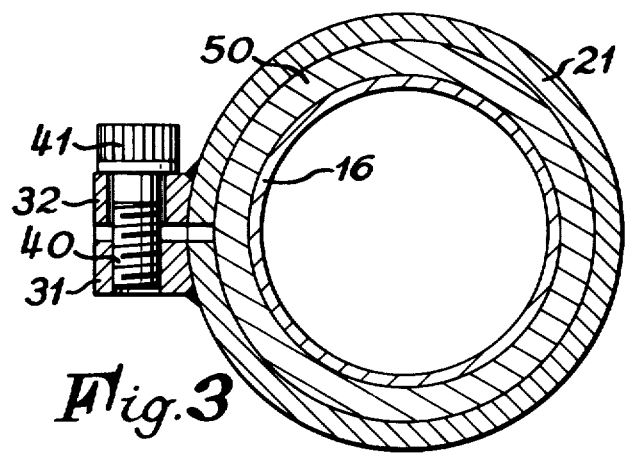
FIG. 3 is a section on the line 3, 3 of FIG. 1.

The T-piece 10 comprises a substantially tubular body 11 having a leg portion 12 of the T-piece communicating therewith at a point intermediate of body 11 and disposed substantially at right angles to the axis of body 11. Each annular end 13 of the body 11 and the body leg 12 has a tube end fitting indicated generally at 14. The body towards each end 13 is generally a tubular cylinder, the outer surface towards the end 13 being cut away at 15 to define a tubular nipple 16 of reduced thickness and having a cylindrical outer surface 17, the inner extremity of the cut-away portion being defined by an annular shoulder 18. The outer surface of body 11 juxtaposed shoulder 18 has a screw thread 19 the remainder of the surface being substantially cylindrical. The leg 12 is joined to the body 11 by means of weld 20.

The nipple 16 and the thread 19 are adapted to accommodate a split ring 21 comprising a sleeve member having at one end a portion 22 of reduced external diameter the inner surface of the reduced portion being threaded at 23 and adapted to engage loosely with the threads 19 on body 11. the sleeve member 21 is provided with a split 24 disposed at an angle inclined to the longitudinal axis of the sleeve member 21 of about 15°. The portion of the split sleeve 21 of large diameter is provided on its internal surface with a plurality of inwardly projecting annular ribs 26. The inner surface 27 of each rib being spaced outwardly of the outer surface 17 of nipple 16 when member 21 is assembled on the body 11 to define a generally annular tube end receiving cavity.

The split 24 is defined by a pair of spaced parallel edges 30 and the outer surface of sleeve member 21 on each side of the split 24 is provided with a radially outwardly directed lug 31 and 32 respectively. The lug 31 is defined by a substantially cylindrical element having a lower edge 33 and an inclined edge 34 corresponding to and contiguous with the inclined edge 30 defining split 24 and the lug 31 and 32 is provided with a circular bore perpendicular to a plane containing the longitudinal axis of sleeve member 21. The bore in the first lug portion 31 is threaded on its internal surface.

The second lug portion 32 is defined by an inclined edge 36 and an outer edge 37 and a cylindrical outer surface corresponding to that of first lug portion 31. The bore in the second lug portion 32 is not threaded and is adapted to receive a threaded stud 40 having a finger portion 41 the upper surface of which finger portion 41 may be countersunk to accept an Allen or like key, the arrangement being such that rotation of the stud 40 results in the lugs 31 and 32 being drawn together to close the split and effect a clamping action on a tube end 50 disposed in said cavity.

The ribs 26 provide annular pressure points about the tube end to effect a seal between the inner surface 51 of the tube and the outer surface 17 of the nipple 16 to prevent leakages, and the tightening of the clamp results in the taking up of any play which exists between the threads 19 on the body and the threaded end 23 on the ring.

By use of the hose end fitting described above, T-pieces and unions have been found to provide an effective and rapid means of joining or effecting junctions of plastic tubes in a leak-free manner.

Internal surface of the fitting may be coated with a corrosion resistant material such as Rilsan or similar surface treating agent by dip coating in a powder.

Figure 4:
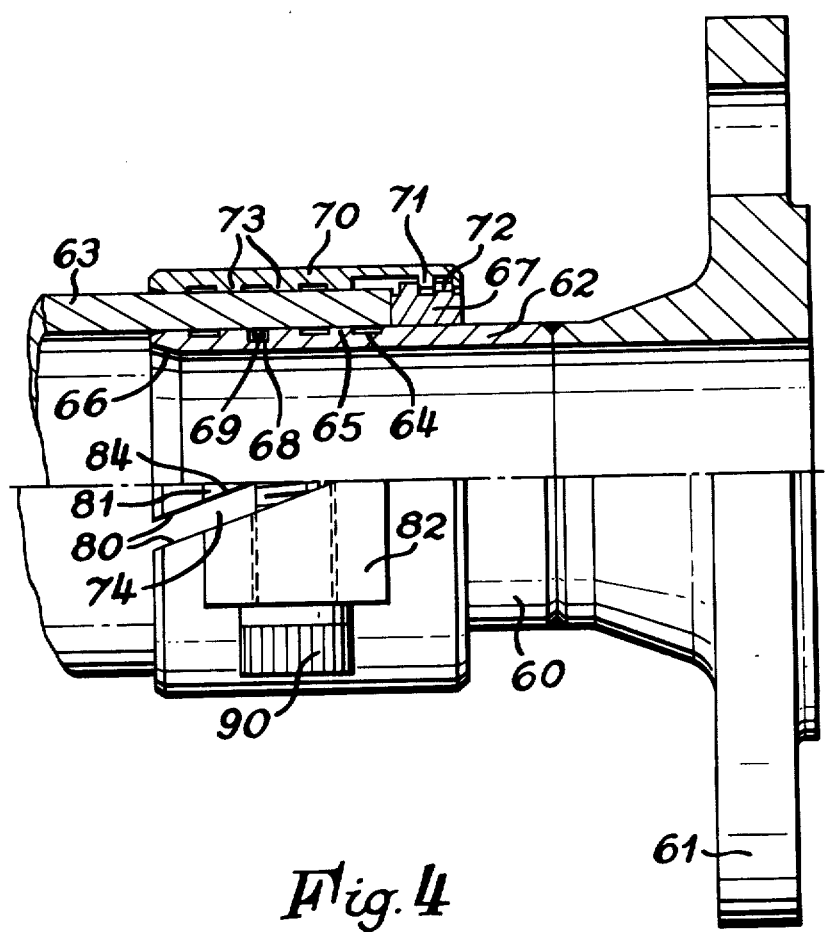
FIG. 4 is a section through an alternative embodiment of the device in accordance with the present invention.

The connection illustrated in FIG. 4 comprises a body 60 connected to, in the specific embodiment illustrated, a flange 61 although, of course, it may be any kind of union or junction. The body 60 has a nipple portion 62, which is of an external diameter slightly less than the natural internal diameter of the pipe 63 with which the connection is to be used. The nipple portion 62 has in its outer surface a plurality of annular grooves 64 to define a plurality of upstanding ribs 65 adapted to abut with the inner surface of pipe end 63. The inner forward extremity 66 of nipple portion 62 is chamfered to reduce resistance to fluid flow within the connection. The rearward end of nipple portion 62 carries an annular retainer 67. The annular retainer 67 is a split ring of natural internal diameter slightly smaller than the diameter of the nipple portion about which it is to fit. The ring 67 is expanded and passed over the nipple portion 62 to the desired location and then is allowed to contract to provide an interference fit of the retainer 67 about the body to define the rearward extremity of the nipple portion.

The nipple portion 62 is provided with a distinct annular groove 68 accommodating a rubber O-ring 69 which may be formed of neoprene.

The retainer carries a split ring 70 comprising a sleeve member having at a rearward end, a plurality of annular ribs 71 adapted to co-operate with and engage corresponding ribs 72 on the outer surface of retainer 67. The forward end of ring 70 is provided on the internal surface with a plurality of inwardly directed ribs 73 juxtaposed corresponding outwardly directed ribs 65 on the nipple portion the arrangement being such that the ring 70 loosely engages retainer 67 to permit the entry of a tube end 63 over the nipple portion 62 until the extremity of the tube abuts retainer 67.

The sleeve member 70 is provided with a split 74 inclined to the longitudinal axis of the sleeve member 70 at an angle of about 15°. The split 74 is defined by a pair of spaced parallel edges 80. The outer surface of sleeve member 70 on each side of split 74 is provided with radially outwardly directed lugs 81 and 82 respectively.

Lug 81 is defined by substantially cylindrical element having an inclined edge 84 defining an extremity of split 74 and each of lugs 81 and 82 is provided with a circular bore perpendicular to the plane containing the longitudinal axis of sleeve 70. The bore in the first lug portion 81 is threaded on its internal surface.

The second lug portion 82 is defined by an inclined edge defining an extremity of split 74 and a cylindrical outer surface corresponding to that of first lug portion 81.

The bore in the second lug portion 82 is not threaded and is adapted to receive a stud 90 having a knurled finger engaging portion or other means to accept an Allen or like key or screwdriver so that rotation of the stud 90 results in the lugs 81 and 82 being drawn together to close the split and to effect a clamping action on the tube end 63 disposed about the nipple portion 62.

The ribs 73 and 65 on the sleeve member 70 and the nipple portion 62 respectively provide co-operating pressure points on the tube and serve to deform the tube in that area to effect a positive and tight clamp.

The O-ring is compressed by the application of the pressure and effects a positive and yet resilient seal between the internal surface of the tube and the nipple portion of the body 60.

It will be appreciated that a plurality of O-rings may be employed instead of the one shown in the accompanying FIG. 4.

The coupling of FIG. 4 has been subjected to severe pressure tests and heat cycling tests when used in conjunction with a tube formed of cross-linked polyethylene for a hot water heating system and it has been found that these devices provide a facile and ready means of fastening lengths of cross-linked polyethylene tubing to unions couplings and the like. Tests show that the couplings described above are capable of withstanding considerable pressure of fluid and are particularly suitable as high pressure couplings for fluid transport systems.

I claim:

1. A tube end fitting comprising:

a body having an axially extending, annular nipple adapted for insertion into a tube;

a substantially cylindrical axially extending ring fitted over said nipple; said ring having axially opposite ends; said ring being split only through one side of said ring such that said ring has only a single split therein; said split extending completely axially along said ring and through its said ends; said ring having an interior with an inner diameter; said nipple having an exterior with an outer diameter; said ring inner diameter being greater than said nipple outer diameter and said ring interior being spaced from said nipple exterior;

cooperating engaging means on said ring and on said body and being normally in continuous engagement with said ring clamped and unclamped; said engaging means of said body comprising an annular retainer passing around and seating on and outside said nipple; a first group of ribs on the exterior of said retainer and positioned axially along said retainer to define grooves for receiving other ribs; said engaging means of said ring comprising a second group of ribs projecting radially inwardly of said ring and being of radial height and spacing so as to mate with and engage said first group of ribs, thereby to engage said ring and said body; said engaging means of said ring being spaced away from one said end of said ring, so that between said nipple and said ring, starting at said one end of said ring and moving away therefrom toward said engaging means of said ring, there is defined between said ring and said nipple an annular cavity that is adapted to accommodate a tube end;

clamp means carried by said ring for clamping said split thereof together, to effect a clamping action of said ring about a tube disposed around said nipple wherein said clamp means acts upon said ring to take up the resultant play between the components of siad engaging means and to retain said ring upon said body;

said nipple exterior being contoured with a third plurality of outwardly projecting ribs, all having respective axial boundaries, and said ring interior being contoured with a fourth plurality of radially inwardly projecting ribs also all having respective axial boundaries; each said radially outwardly projecting rib being radially aligned with and having the same axial boundaries as a respective one of said radially inwardly projecting ribs, such that cooperation of said radially aligned ribs enhances the clamping and securing of a tube between said nipple and said ring.

2. A fitting as claimed in claim 1, wherein said ring has a longitudinal axis through its said opposite ends and said split is oriented at an oblique angle to the direction of extension of said ring axis.

3. A tube end fitting as claimed in claim 1, further comprising:

an annular groove in and extending around said nipple exterior and defined between two neighboring said ribs of said third plurality; said two ribs having opposed, facing walls defining said groove; said groove walls being of a diametral height such that with said clamp means clamping said split of said ring together, said annular groove has diametral depth beyond the interior surface of a tube placed in said cavity; an O-ring fitted in said groove; said groove and said O-ring being of respective diametral heights such that said O-ring engages and seals against said walls of said groove and against the interior surface of a tube placed in said cavity.

4. A fitting as claimed in claim 3 wherein the O-ring is formed of neoprene.

5. A tube end fitting as claimed in claim 1 further comprising:

said third and said fourth pluralities of ribs having inward ends adapted to engage a tube placed in said cavity for enhancing the clamping and securing of said ring and said nipple against a tube disposed in said cavity; said ribs of said third and said fourth pluralities having a diametral height with respect to the diameter of said nipple and said ring, respectively, such that with said clamp means clamping said split of said ring together, all said rib inward ends are forced into a tube disposed in said cavity and said ribs of said third and said fourth pluralities having diametral heights such that there remains a space between neighboring said ribs into which the material of the tube does not extend.

* * * * *